United States Patent
Se et al.

(10) Patent No.: US 12,183,064 B2
(45) Date of Patent: Dec. 31, 2024

(54) DEEP LEARNING INFERENCE SYSTEMS AND METHODS FOR IMAGING SYSTEMS

(71) Applicant: Teledyne FLIR Commercial Systems, Inc., Goleta, CA (US)

(72) Inventors: Shuen Yan Stephen Se, Richmond (CA); Damian Michael Patrick Nesbitt, Richmond (CA); Ian Kenneth Stadler, Richmond (CA)

(73) Assignee: TELEDYNE FLIR COMMERCIAL SYSTEMS, INC., Goleta, CA (US)

( * ) Notice: Subject to any disclaimer, the term of this patent is extended or adjusted under 35 U.S.C. 154(b) by 547 days.

(21) Appl. No.: 17/224,040

(22) Filed: Apr. 6, 2021

(65) Prior Publication Data

US 2021/0227126 A1  Jul. 22, 2021

Related U.S. Application Data

(63) Continuation of application No. PCT/US2019/056159, filed on Oct. 14, 2019.
(Continued)

(51) Int. Cl.
*G06V 10/82* (2022.01)
*G06N 3/045* (2023.01)
(Continued)

(52) U.S. Cl.
CPC .............. *G06V 10/82* (2022.01); *G06N 3/045* (2023.01); *G06N 5/04* (2013.01); *G06V 10/764* (2022.01); *G06V 20/10* (2022.01); *H04N 23/61* (2023.01)

(58) Field of Classification Search
CPC ...... G06V 10/82; G06V 10/764; G06V 20/10; G06N 3/045; G06N 5/04; H04N 23/61; G06F 18/2413
See application file for complete search history.

(56) References Cited

U.S. PATENT DOCUMENTS 9,871,959 B1 * 1/2018 Hlatky .................. H04N 23/62
10,133,933 B1 * 11/2018 Fisher ..................... G06V 20/41
(Continued)

FOREIGN PATENT DOCUMENTS

CN   106251314 A   12/2016
CN   106934426 A    7/2017
(Continued)

OTHER PUBLICATIONS

Mithun et al., "Odds: Real-Time Object Detection Using Depth Sensors on Embedded GPUs", Information Processing in Sensor Networks, Apr. 11, 2018, pp. 230-241, IEEE Press, United States of America.
(Continued)

*Primary Examiner* — Nasim N Nirjhar
(74) *Attorney, Agent, or Firm* — Haynes and Boone, LLP

(57) ABSTRACT

Deep learning inference for imaging systems includes an imaging device comprising an image capture component and a vision processing unit configured to process the image through a first trained inference network to determine a first inference result. A host system trains a neural network for image classification and produces and transmits the first trained inference network to the vision processing unit of the imaging device. The first trained inference network provides stand-alone image classification, an object detection and/or a confidence score to the imaging device. The vision processing unit may further comprise a two or more trained inference networks configured to receive an inference result as an input and output a second inference result. A stereo camera system uses features and/or results from one or more inference network to control processing of three-dimensional data for the detected object.

17 Claims, 12 Drawing Sheets

Related U.S. Application Data

(60) Provisional application No. 62/745,948, filed on Oct. 15, 2018.

(51) Int. Cl.
    *G06N 5/04*     (2023.01)
    *G06V 10/764*     (2022.01)
    *G06V 20/10*     (2022.01)
    *H04N 23/61*     (2023.01)

(56) References Cited

U.S. PATENT DOCUMENTS

| | | |
|---|---|---|
| 2017/0154425 A1 | 6/2017 | Pierce et al. |
| 2018/0150695 A1 | 5/2018 | Guttmann |
| 2019/0213481 A1* | 7/2019 | Godard ................. G06T 3/4007 |
| 2019/0340567 A1* | 11/2019 | Long ..................... G06F 1/1686 |
| 2023/0074368 A1* | 3/2023 | Rankawat .............. G05D 1/249 |

FOREIGN PATENT DOCUMENTS

| | | |
|---|---|---|
| CN | 108345890 A | 7/2018 |
| WO | WO 2020/081470 A1 | 4/2020 |

OTHER PUBLICATIONS

InVision Magazine, "Inference on the Edge with the FLIR Firefly", Sep. 11, 2018, 4 pages, InVision, Germany.

Gan Xingli et al. "Object Recognition and simultaneous indoor location algorithm with stereo camera", 2018 Ubiquitous Positioning, Indoor Navigation and Location-Based Services (UPINLBS), IEEE, Mar. 22, 2018 (Mar. 22, 2018), pp. 1-6, XP033467105.

\* cited by examiner (b)

(a)

DEEP LEARNING INFERENCE SYSTEMS AND METHODS FOR IMAGING SYSTEMS

CROSS-REFERENCE TO RELATED APPLICATIONS

This application is a continuation of International Patent Application No. PCT/US2019/056159 filed Oct. 14, 2019 and entitled "DEEP LEARNING INFERENCE SYSTEMS AND METHODS FOR IMAGING SYSTEMS," which claims priority to and the benefit of U.S. Provisional Patent Application No. 62/745,948 filed Oct. 15, 2018, and entitled "entitled "DEEP LEARNING INTERFACE SYSTEMS AND METHODS FOR IMAGING SYSTEMS" which are hereby incorporated by reference in their entirety.

TECHNICAL FIELD

One or more embodiments of the present disclosure relate generally to imaging systems, and more particularly, for example, to deep learning inference systems and methods for imaging systems.

BACKGROUND

In the field of image processing, there is an ongoing need for efficient and reliable ways to detect and classify objects of interest within a field of view (e.g., a scene) of an imaging device. Traditional "smart cameras" combine a machine vision imaging component and a single board computer running rules-based image processing software. Smart cameras are a solution for simple problems like barcode reading or answering questions like "does this part have a hole in it where it is supposed to?" Inference cameras excel at more complex or subjective questions like "Is this apple export grade?". When trained on known good images, inference cameras can easily identify unexpected defects which would not be recognized by rules-based inspection systems, making inference cameras far more tolerant to variability.

In one approach, various images of an object of interest are collected into a training dataset for training a neural network to classify the object. The training images may be generated with a camera capturing images of the object at various angles and in various setting. A training dataset often includes thousands of images for each object classification, and can be time consuming, expensive and burdensome to produce and update. The trained neural network may be loaded on a server system that receives and classifies images from imaging devices on a network. Simplified machine vision and image classification systems are available on some imaging devices, but such systems are not capable of running robust trained neural networks and are difficult to adapt to various user scenarios. In view of the foregoing, there is a continued need for improved object detection and classification solutions that are easily adaptable to new use cases and that provide performance or other advantages over conventional systems.

SUMMARY

Various systems and methods are provided for implementing trained neural networks with imaging systems. The inference camera lets users take advantage of rapidly accelerating deep learning technology, frameworks and tools. The camera will allow engineers to spend less time developing complex algorithms while delivering systems that are more tolerant of unanticipated defects.

In various embodiments, a system comprises an imaging device having an image capture component configured to capture an image, and a vision processing unit configured to process the image through a first trained inference network to determine a first inference result (e.g., image classification, an object detection, a region of interest, an anomaly detection and/or a confidence score). A host system is configured to train a neural network for image classification and produce the first trained inference network and transmit the first trained inference network to the vision processing unit of the imaging device. The first trained inference network may be uploaded from the host system to the vision processing unit of the imaging device via a communications network and may be configured to provide stand-alone image classification to the imaging device. In some embodiments, the first inference result may be communicated to the host system.

In some embodiments, the first inference result is a region of interest, and the vision processing unit further includes a plurality of trained inference networks configured to receive an inference result as an input and output a second inference result.

The imaging device may further include an image processing component configured to receive the image captured by the image capture component and modify the image for input to the first trained inference network. The image device may further include a processing component configured to control the operation of the imaging device, including processing the first inference result and/or determining an associate action to take for the image. In some embodiments, the associated action may include streaming the image to a host system, storing the image on the imaging device, and/or executing a second inference network.

In some embodiments, the first trained inference network is encrypted and stored in a first memory, and the first trained inference network is decrypted and loaded into a random-access memory for inference.

In some embodiments, the image capture component is configured to capture visible spectrum images, infrared images, color images, hyperspectral image, grayscale images and/or monochrome images.

In various embodiments, a method comprises loading onto a vision processing unit of an imaging device a first trained inference network, capturing an image using an imaging component of the imaging device, and processing the image through the first trained inference network to determine a first inference result. The method may further include training, by a host system, a neural network for image classification to produce the first trained inference network, wherein loading onto the vision processing unit further comprises uploading the first trained inference network from the host system to the imaging device. In some embodiments, the first trained inference network is configured to provide stand-alone image classification to the imaging device.

The method may further include transmitting the first inference result to a host system across a communications network, processing the first inference result through a second trained inference network to determine a second inference result, and/or determining, based on the first inference result, an associated action for the image. In various embodiments, the associated action may include streaming the image to a host system, storing the image on the imaging device, and/or executing a second inference network.

In some embodiments, the method includes processing the image through an image processing component. The method may also include encrypting and storing the first trained inference network in a first memory, and decrypting and loading the first trained inference network into a random-access memory for inference.

In various embodiments, a system includes a stereo imaging device comprising two or more image capture components configured to capture a pair of images of a scene, a vision processing unit configured to process the image pair through a first trained inference network to determine a first inference result, and a processing component configured to process the first inference result and determine, based on the first result, an action for image pair. The vision processing unit is further configured to detect and/or classify one or more objects in the image pair and determine two-dimensional and/or three-dimensional location of objects detected by the first trained inference network. The two or more image capture components may comprise a binocular stereo camera system, and the two or more image capture components may be calibrated to produce rectified image pairs for input to the first trained inference network.

In some embodiments, the trained inference network detects objects of interest in the image pair and generates bounding boxes of corresponding two-dimensional locations in at least one of the images in the image pair, image features computed during the deep learning inference are used as features for stereo matching, and three-dimensional data is used to control a robotic system to interact with the detected object. The vision processing unit may be further configured to perform stereo matching on regions of interest in the image pair based on the bounding boxes to produce spatial location information for the objects of interest, wherein stereo matching is performed when objects of interest are detected, and the stereo matching can be either a correlation-based method to generate a dense three-dimensional point cloud and/or a feature-based method to generate a sparse three-dimensional point cloud.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to image classification, and more particularly, for example, to deep learning inference systems and methods for imaging systems.

In various embodiments, an improved imaging device (e.g., a digital camera) includes deep learning technology systems and methods that enable the deployment of trained neural networks for a variety of uses. In various embodiments, the imaging device includes an image sensor, a vision processing unit and interfaces that integrate machine vision with deep learning inference. In some embodiments, the vision processing unit (VPU) is an Intel Movidius Myriad 2 VPU or similar processor that combines high-speed hardware image processing filters, general purpose CPU cores and parallel vector processing cores. Vector cores may be used to accelerate on-camera inference are more optimized for the branching logic of neural networks than the more general-purpose cores found in graphics processing units. This greater degree of optimization enables the VPU to achieve a high level of performance in low power devices.

Figure 1A:
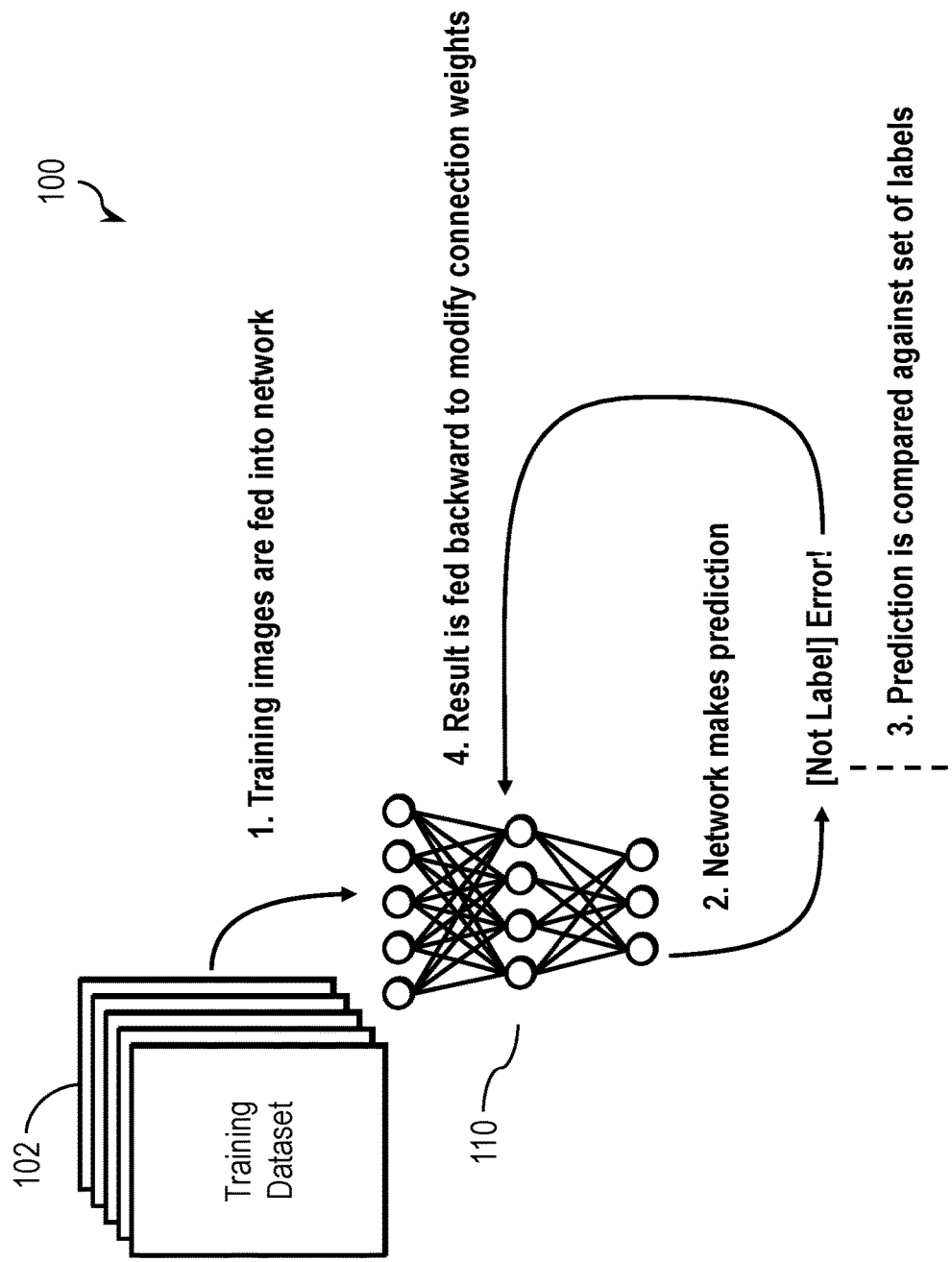
FIG. 1A illustrates an example training process for an inference imaging system, in accordance with various embodiments of the present disclosure.

The deep learning inference enables inference applications that make classification predictions of newly captured, unlabeled real-world images. Referring to FIG. 1A, training of an inference engine will now be described in accordance with one or more embodiments. The training system 100 includes a labeled dataset of training images (training dataset 102) that are fed into a neural network 110. The neural network 110 may be one or more different types of neural networks that can be used for inference. In some embodiments, the neural network is optimized for image classification and segmentation on a mobile device. The neural network 110 makes a prediction for each training image and the prediction is compared to the image label. The results (e.g., a mislabeling of an image) are fed back into the network to modify the connection weights and refine the predictions for greater accuracy.

Figure 1B:
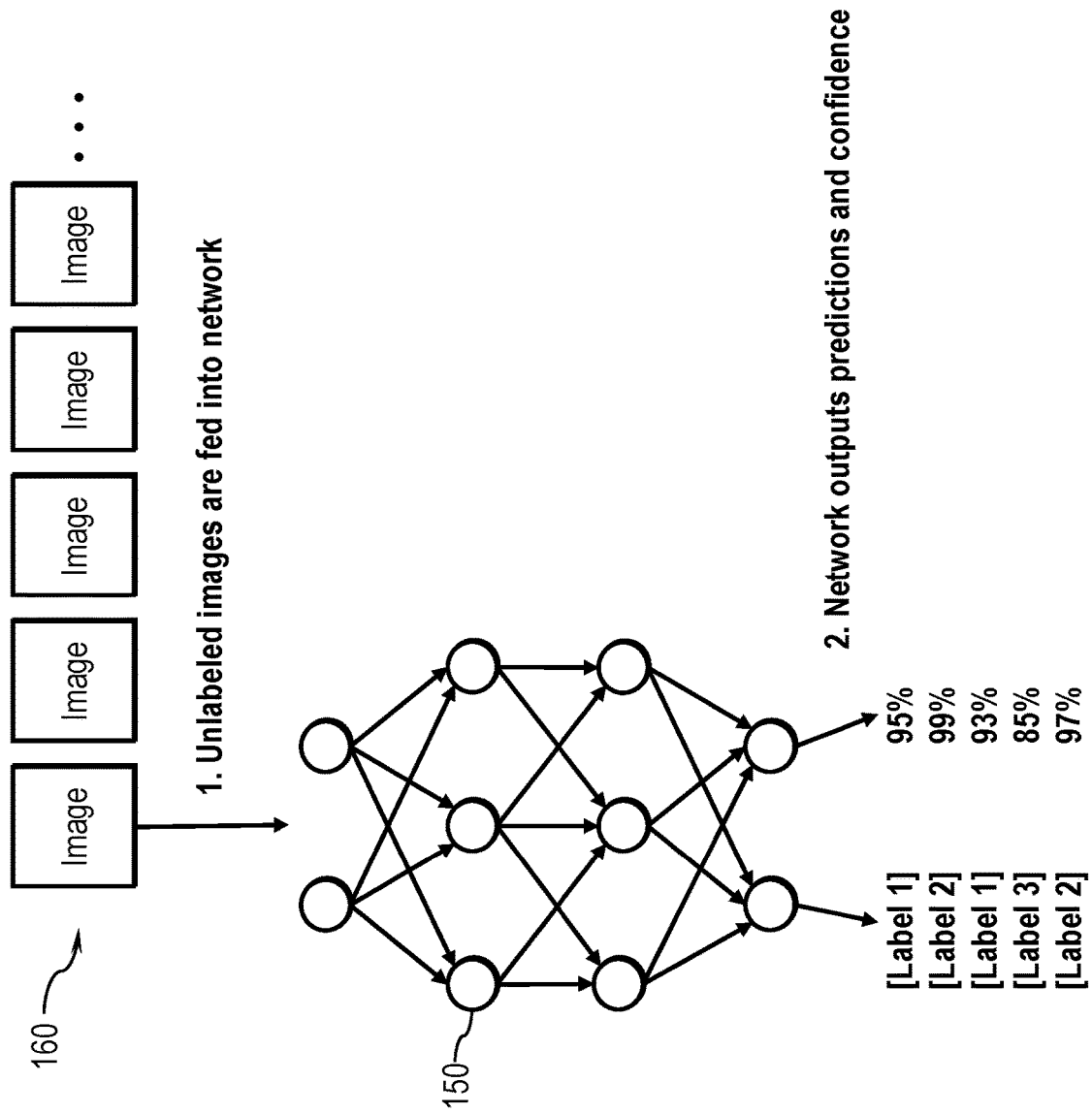
FIG. 1B illustrates an example classification operation of an inference imaging system, in accordance with various embodiments of the present disclosure.

Referring to FIG. 1B, operation of a trained inference network 150 will now be described in accordance with one or more embodiments. Captured images 160 are fed into the trained inference network 150, which outputs classification predictions and confidence for each image. The imaging device may then use the image classification prediction to determine further image processing actions.

Inference cameras can be used to augment existing applications with rich and descriptive metadata. For example, an inference camera can tag images which are then passed to a host which carries out traditional rules-based image processing. In this way users can quickly expand the capabilities of their existing vision systems. The general-purpose nature of the computing hardware used in traditional smart cameras means they are less power efficient, and physically much larger than the inference cameras disclosed herein. In various embodiments, the inference cameras disclosed herein may be implemented on an open platform, giving users the flexibility to take advantage of the rapid pace of advancement of deep learning networks and the associated toolchain for their training and optimization. In contrast, traditional smart cameras are programmed using proprietary tools which may lag the most recent advances.

In various embodiments, the inference camera is implemented as an edge device connected to a larger networked system. By enabling inference on the "edge" of a vision system, the inference cameras of the present disclosure deliver improvements in system speed, reliability, power efficiency, and security. The inference cameras move various image processing functionality away from a central server and close to the data's source. Rather than transmitting whole images to a remote server, the inference camera can transmit descriptive data as needed, which may greatly reduce the amount of data which a system must transmit, minimizing network bandwidth and system latency. For certain applications the inference camera disclosed herein can eliminate a system's dependence on server and network infrastructure, increasing its reliability.

With a built-in VPU, the inference camera may be capable of operating as a stand-alone image classification system. In some embodiments, the inference camera can capture images and make decisions based on those images, then trigger actions using signaling (e.g., General Purpose Input/Output (GPIO) signaling). For example, the actions may include streaming the image to a host system, storing the image on the imaging device, and communicating information (e.g., the inference result, confidence, location of the results) to a peripheral device via GPIO, and/or executing a second inference network. Communications may be facilitated using binary logic values via GPIO, encoded values with multiple GPIO, pulse width modulation, serial port communication over the GPIO pins and/or other communications protocols.

In operation, the inference camera may be configured to trigger a networked vision system only when needed, which allows more processing time to be spent on traditional rules-based image processing and analysis. For example, deep leaning inference can be used to trigger high-power image analysis, when specific conditions are met. In some embodiments, the VPU may provide additional power savings by supporting cascaded networks. This enables multiple tiers of analysis, with more complex and higher power networks only being called if they meet the conditions of the previous network. The small amount of data that is transmitted is also easily encrypted, improving system security.

Figure 2:
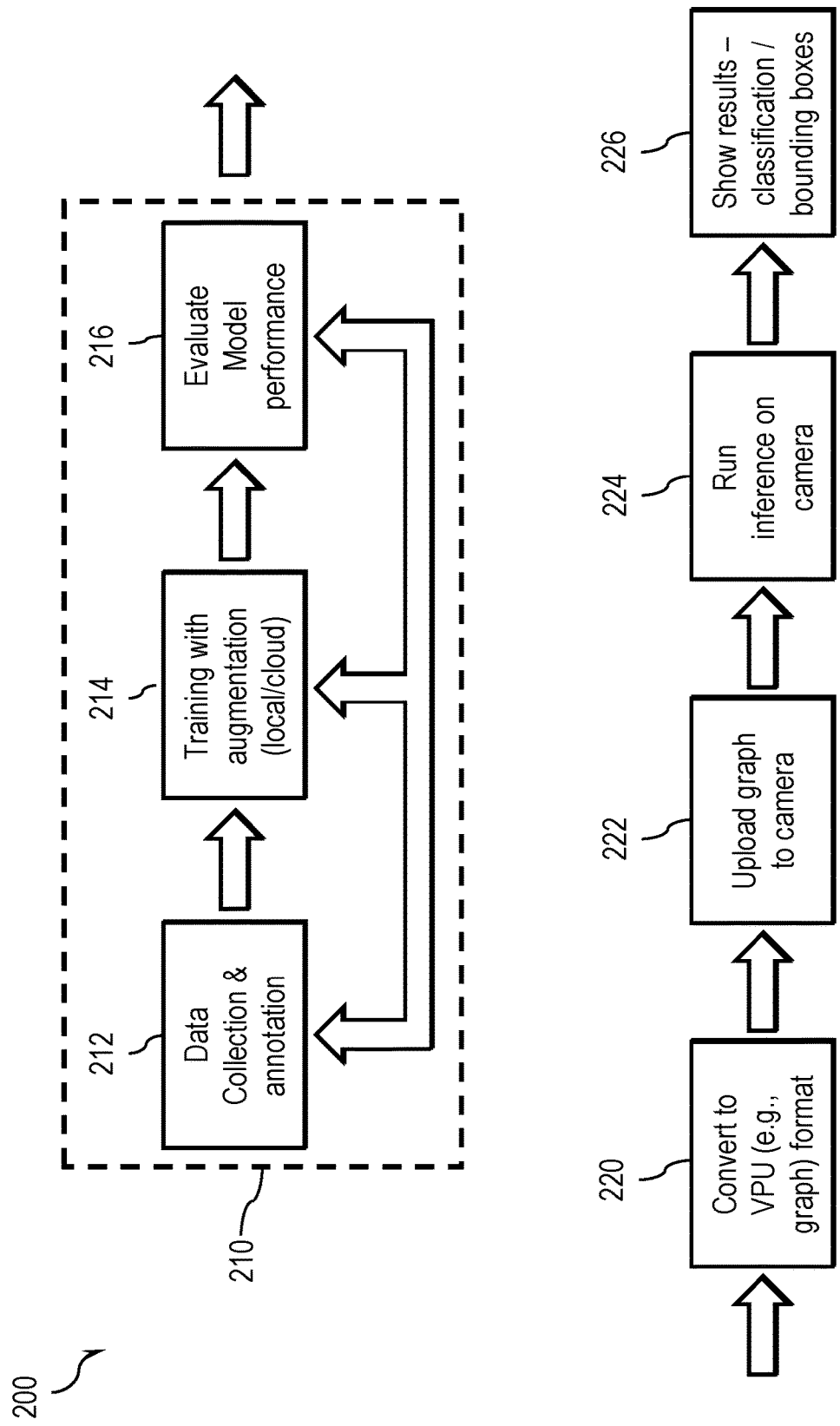
FIG. 2 illustrates an example workflow for an inference imaging system, in accordance with various embodiments of the present disclosure.

Referring to FIG. 2, an embodiment of an inference camera workflow 200 will now be described. The use of deep learning for machine vision applications is desirable because it does not require the complex algorithm development required by traditional rules-based approaches. For example, it is easier to have examples of defects than algorithmic descriptions of the defects. In an offline training stage 210, labeled images are used for training the inference network to make predictions on new images. A training dataset is compiled (step 212), including sample images and corresponding labels defining desired classifications. The training dataset is then used to train the inference network (step 214) and the results are evaluated (step 216) and fed back through the offline training stage 210, causing updates in the training dataset and weights of the inference network as appropriate. In various embodiments, the camera and captured images may be visible spectrum, infrared, monochrome, hyperspectral, grayscale, color and other imaging systems.

The pre-trained inference network is then converted to operate on the VPU of the inference camera (step 220) and uploaded to the VPU of the inference camera (step 222). As images are captured, the images may be fed to the inference network (step 224) on the camera VPU to produce classification results associated with the image (step 226). As illustrated, the inference camera is configured to capture high quality images and perform deep learning inference onboard the camera without host and cloud connectivity. The inference camera may then send classification/detection inference results to peripheral devices (e.g., via GPIO) or to host devices through network connectivity.

In various embodiments, users can upload pre-trained networks to the deep learning inference camera or train new networks specific to a desired application. The inference model may include multiple models, where results from one model are fed to subsequent models for further classification. In some embodiments, the inference network is encrypted and loaded into RAM for inference. The inference camera may be configured for use with and/or without cloud or host connectivity. In some embodiments, the inference camera consumes less power than traditional smart cameras and uses GPIO (General Purpose Input/Output) to communicate with peripheral devices. The inference camera may also be configured to stream low latency images to a host system (e.g., using USB3/GigE vision) while on-camera inference augments the images with rich, descriptive metadata.

Inference results (e.g., classification and/or detection) may be sent to a host in various forms. In some embodiments, inference results may be sent to the host via events. The inference may be performed on a full image, or a region of interest, as desired. The inference results may include preliminary data that is used for further decision making. The inference results may be used to determine which images to stream to the host, store on the camera and/or discard. In some embodiments, the inference network is configured to run on inference camera startup.

Figure 3:
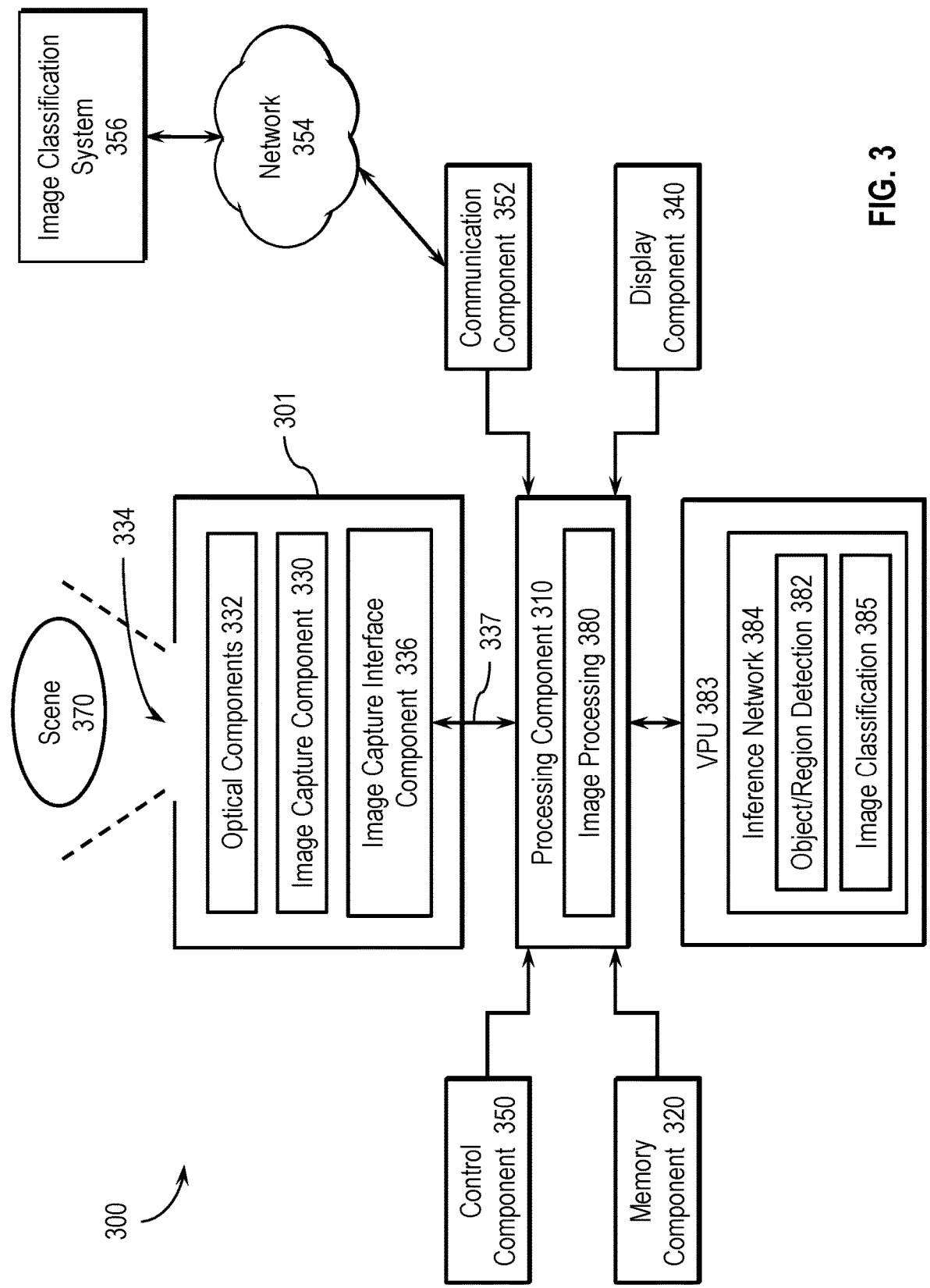
FIG. 3 illustrates an example inference imaging system, in accordance with various embodiments of the present disclosure.

Referring to FIG. 3, embodiments of an inference camera 300 will now be described. The inference camera 300 may be an imaging system used, for example, to capture and process images to detect, classify and/or count objects that appear in a field of view. As illustrated, the inference camera 300 may be used for imaging a scene 370) in a field of view. The inference camera 300 includes a processing component 310, a memory component 320, an image capture component 330, optical components 332 (e.g., one or more lenses configured to receive electromagnetic radiation through an aperture 334 in camera component 301 and pass the electromagnetic radiation to image capture component 330), an image capture interface component 336, an optional display component 340, a control component 350, a communication component 352, and other sensing components.

In various embodiments, inference camera 300 may be implemented as an imaging device, such as camera component 301, to capture image frames, for example, of the scene 370 in the field of view of camera component 301. In some embodiments, camera component 301 may include image capture component 330, optical components 332, and image capture interface component 336 housed in a protective enclosure. Inference camera 300 may represent any type of camera system that is adapted to image the scene 370 and provide associated image data. Inference camera 300 may be implemented with camera component 301 at various types of fixed locations and environments (e.g., highway overpass to track traffic, as part of a premises surveillance system, to monitor/track people, etc.). In some embodiments, camera component 301 may be mounted in a stationary arrangement to capture successive images of a scene 370. Inference camera 300 may include a portable device and may be implemented, for example, as a handheld device and/or coupled, in other examples, to various types of vehicles (e.g., a land-based vehicle, a watercraft, an aircraft, a spacecraft, or other vehicle).

Processing component 310 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), a graphics processing unit and/or any other appropriate combination of processing device and/or memory to execute instructions to perform any of the various operations described herein. Processing component 310 is adapted to interface and communicate with components 320, 330, 340, and 350 to perform method and processing steps as described herein. Processing component 310 is also adapted to detect and classify objects in the images captured by the image capture component 330, through image processing component 380, object/region detection module 382, and VPU 383, which includes a trained inference network 384.

It should be appreciated that processing operations and/or instructions may be integrated in software and/or hardware as part of processing component 310, or code (e.g., software or configuration data) which may be stored in memory component 320. Embodiments of processing operations and/or instructions disclosed herein may be stored by a machine-readable medium in a non-transitory manner (e.g., a memory, a hard drive, a compact disk, a digital video disk, or a flash memory) to be executed by a computer (e.g., logic or processor-based system) to perform various methods disclosed herein. In various embodiments, the processing operations include a GenICam (Generic Interface for Cameras) interface.

Memory component 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 310 is adapted to execute software stored in memory component 320 and/or a machine-readable medium to perform various methods, processes, and operations in a manner as described herein.

Image capture component 330 includes, in one embodiment, one or more sensors for capturing image signals representative of an image, of scene 370. In one embodiment, the sensors of image capture component 330 provide for representing (e.g., converting) a captured infrared image signal of scene 370 as digital data (e.g., via an analog-to-digital converter included as part of the sensor or separate from the sensor as part of inference camera 300). Infrared sensors may include a plurality of infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

In some embodiments, the image capture component 330, processing component 310 and other components of the inference camera 300 are configured to capture time-of-flight images. For example, the inference camera 300 may be implemented as a time-of-flight camera that measures the round-trip time of a light signal (e.g., an LED light, a laser, etc.) and captures the result in an image where one or more points on the image represents a distance between the inference camera 300 and a corresponding point on an imaged object. Processing component 310 may be adapted to receive image signals from image capture component 330, process image signals (e.g., to provide processed image data), store image signals or image data in memory component 320, and/or retrieve stored image signals from memory component 320. In various aspects, processing component 310 may be remotely positioned, and processing component 310 may be adapted to remotely receive image signals from image capture component 330 via wired or wireless communication with image capture interface component 336, as described herein.

Display component 340 may include an image display device (e.g., a liquid crystal display (LCD)) or various other types of generally known video displays or monitors. Control component 350 may include, in various embodiments, a user input and/or interface device, such as a keyboard, a control panel unit, a graphical user interface, or other user input/output. Control component 350 may be adapted to be integrated as part of display component 340 to operate as both a user input device and a display device, such as, for example, a touch screen device adapted to receive input signals from a user touching different parts of the display screen.

Processing component 310 may be adapted to communicate with image capture interface component 336 (e.g., by receiving data and information from image capture component 330). Image capture interface component 336 may be configured to receive image signals (e.g., image frames) from image capture component 330 and communicate image signals to processing component 310 directly or through one or more wired or wireless communication components (e.g., represented by connection 337) in the manner of communication component 352 further described herein. Camera component 301 and processing component 310 may be positioned proximate to or remote from each other in various embodiments.

In one embodiment, communication component 352 may be implemented as a network interface component adapted for communication with a network including other devices in the network and may include one or more wired or wireless communication components. In various embodiments, a network 354 may be implemented as a single network or a combination of multiple networks, and may include a wired or wireless network, including a wireless local area network, a wide area network, the Internet, a cloud network service, and/or other appropriate types of communication networks.

In various embodiments, inference camera 300 provides a capability, in real time, to detect, classify and/or count objects in the scene 370. For example, inference camera 300 may be configured to capture images of scene 370 using camera component 301 (e.g., an infrared camera). Captured images may be received by processing component 310 and stored in memory component 320. The image processing component 380 and object/region detection module 382 may extract from each of the captured images a subset of pixel values of scene 370) corresponding to a detected object. The trained inference network 384 (e.g., a trained image classification neural network) classifies the detected object and stores the result in the memory component 320, an object database or other memory storage in accordance with system preferences. In some embodiments, inference camera 300 may send images or detected objects over network 354 (e.g., the Internet or the cloud) to a server system, such as image classification system 356, for remote image classification. The object/region detection module 382 and trained inference network 384 provide analysis of the captured images to detect and classify one or more objects. In various embodiments, the inference network is a trained image classification system that may be implemented in a real-time environment.

Figure 4:
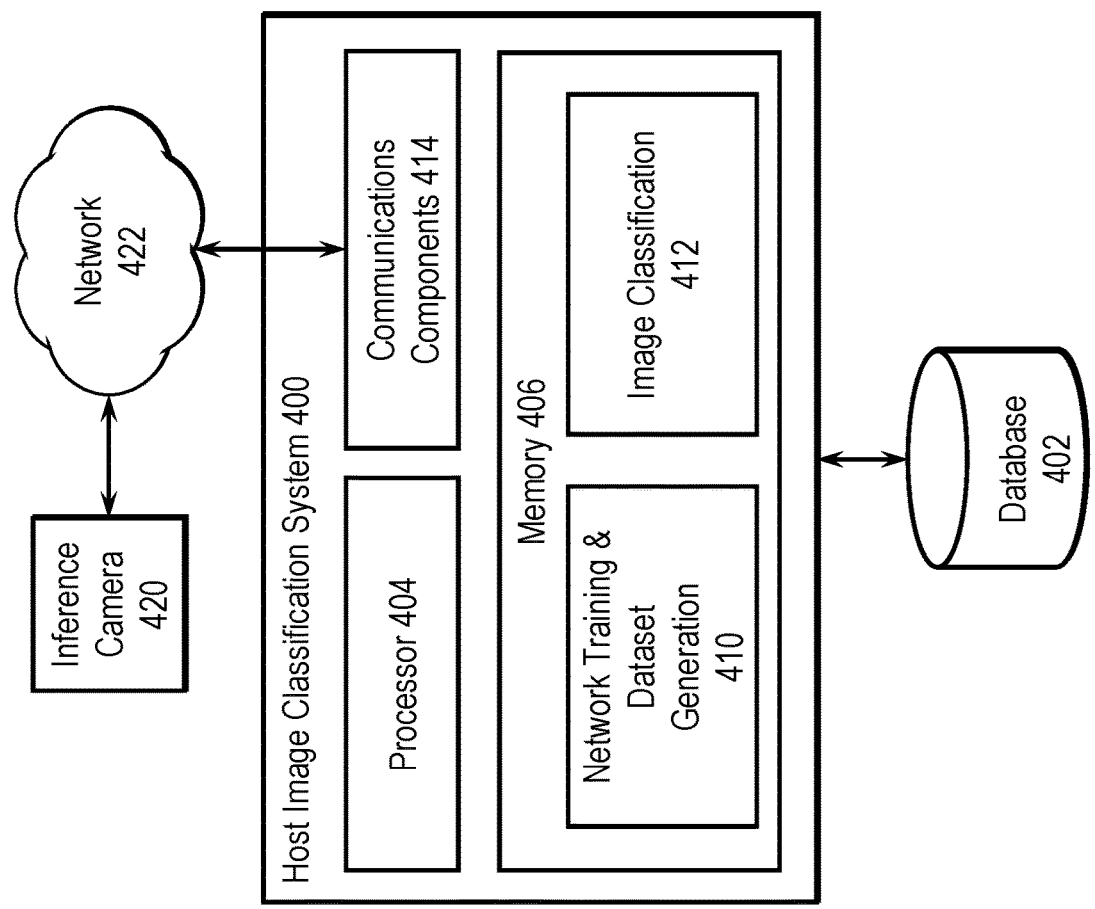
FIG. 4 illustrates an example host image classification system for use with an inference imaging device, in accordance with embodiments of the present disclosure.

The inference camera 300 may be configured to operate with one or more computing devices, servers and/or one or more databases, and may be combined with other components in an image classification system. Referring to FIG. 4, various embodiments of a host image classification system 400 will now be described. The host image classification system 400 may be implemented on one or more servers such as an application server that performs data processing and/or other software execution operations for generating, storing, classifying and retrieving images. In some embodiments, the components of the host image classification system 400 may be distributed across a communications network, such as communications network 422. The communications network 422 may include one or more local networks such as a wireless local area network (WLAN), wide area networks such as the Internet, and other wired or wireless communications paths suitable for facilitating communications between components as described herein. The host image classification system 400 includes communications components 414 configured to facilitate communications with one or more inference cameras 420 over the communications network 422.

In various embodiments, the host image classification system 400 may operate as a general-purpose image classification system, such as a cloud-based image classification system, or may be configured to operate in a dedicated system, such as a video surveillance system that stores video and images captured in real time from a plurality of image capture devices and identifies and classifies objects using a database 402. The host image classification system 400 may be configured to receive one or more images (e.g., an image captured from infrared camera of a video surveillance system or a visible light image) from one or more inference cameras 420 and process associated object identification/classification requests.

As illustrated, the host image classification system 400 includes one or more processors 404 that perform data processing and/or other software execution operations for the host image classification system 400. The processor 404 may include logic devices, microcontrollers, processors, application specific integrated circuits (ASICs), field programmable gate arrays (FPGAs) or other devices that may be used by the host image classification system 400 to execute appropriate instructions, such as software instructions stored in memory 406, including network training and dataset generation component 410, and image classification component 412 (e.g., a neural network trained by the training dataset), and/or other applications. The memory 406 may be implemented in one or more memory devices (e.g., memory components) that store executable instructions, data and information, including image data, video data, audio data, network information. In various embodiments, the host image classification system 400 may be configured to interface with various network devices, such as a desktop computer or network server, a mobile computing device such as a mobile phone, tablet, laptop computer or other computing device having communications circuitry (e.g., wireless communications circuitry or wired communications circuitry) for connecting with other devices in the host image classification system 400.

The communications components 414 may include circuitry for communicating with other devices using various communications protocols. In various embodiments, communications components 414 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 414 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 414.

Figure 5A:
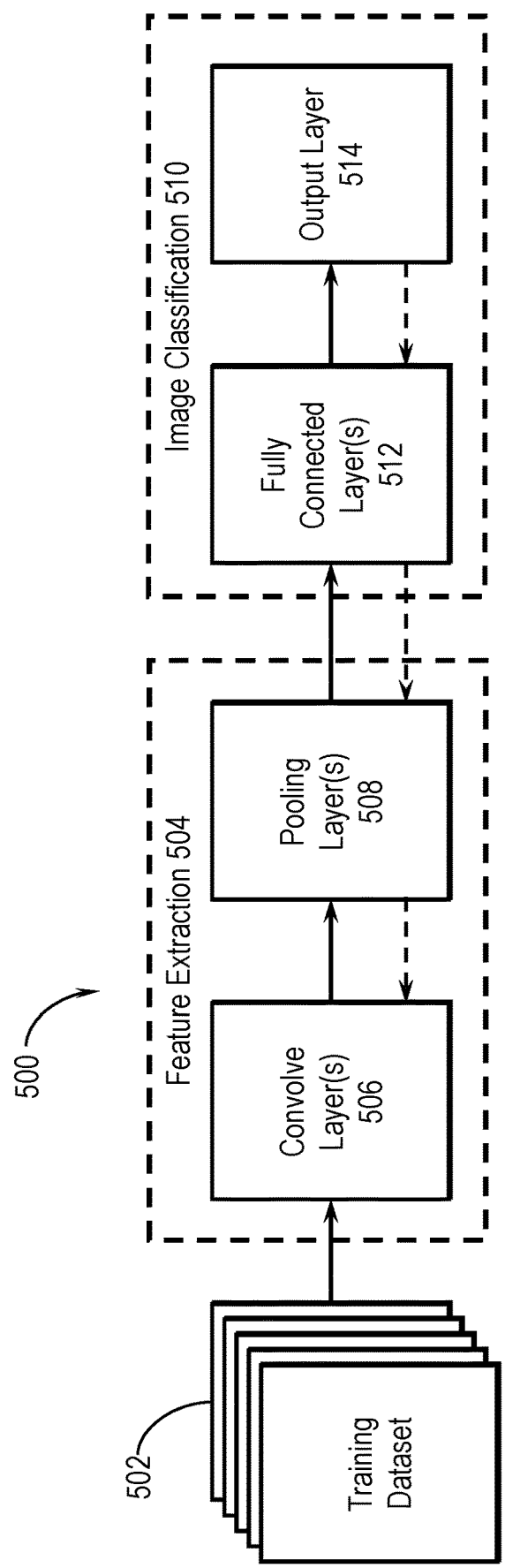
FIG. 5A illustrates an example neural network training process, in accordance with various embodiments of the present disclosure.

Various embodiments of a neural network will now be described with reference to FIGS. 5A-C. Referring to FIG. 5A, a neural network 500 is a convolutional neural network (CNN) that receives a training dataset 502 and outputs a classification for each image. The training dataset 502 includes images captured from an infrared, visible light, or other type of camera. In some embodiments, the training images include one or more synthetically generated or modified images. The training dataset 502 may also include other image classification input data (e.g., the output of another trained neural network) that may be available to an inference camera. For object classification, the images may comprise a region of interest from a captured image that includes an object to be identified. In one embodiment, the training starts with a forward pass through the neural network 500 including feature extraction 504 in a plurality of convolution layers 506 and pooling layers 508, followed by image classification 510 in a plurality of fully connected layers 512 and an output layer 514. Next, a backward pass through the neural network 500 may be used to update the CNN parameters in view of errors produced in the forward pass (e.g., misclassified objects). In various embodiments, other neural network processes may be used in accordance with the present disclosure.

Figure 5B:
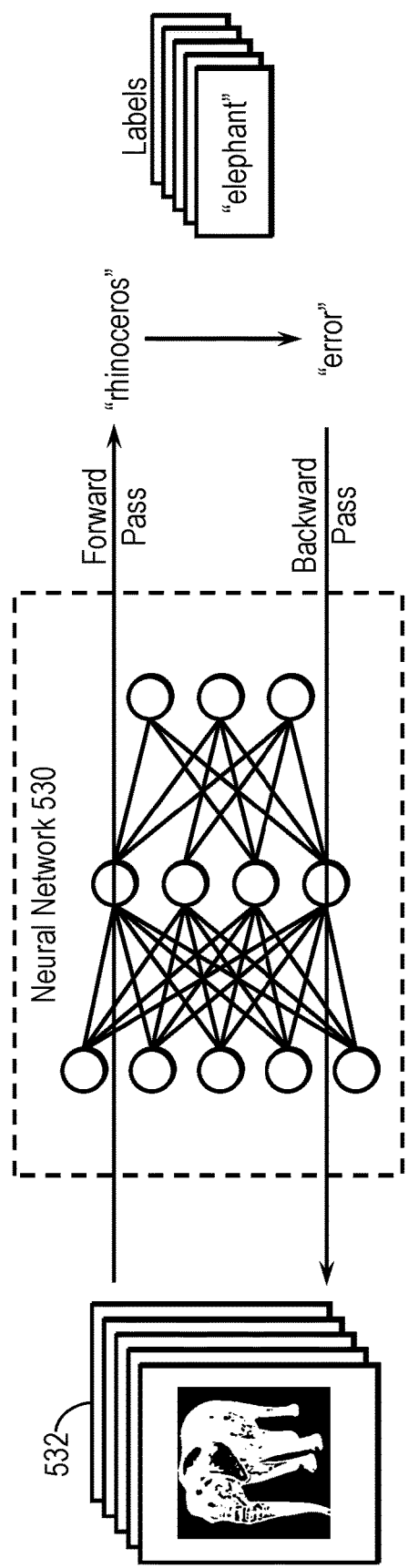
FIG. 5B illustrates an example neural network training process, in accordance with various embodiments of the present disclosure.
Figure 5C:
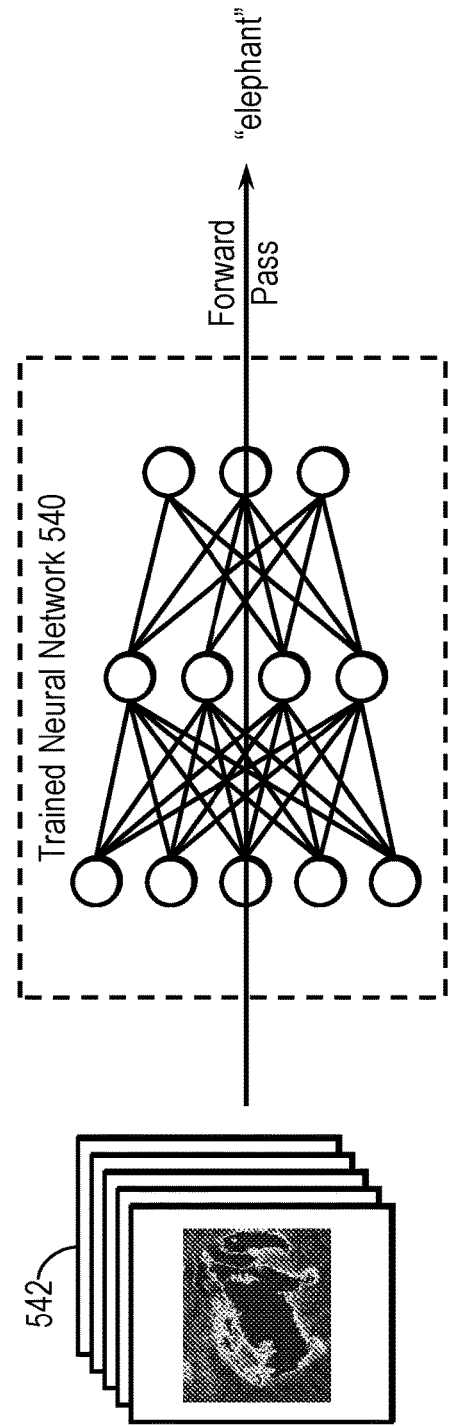
FIG. 5C illustrates an example neural network inference process, in accordance with various embodiments of the present disclosure.

Referring to FIG. 5B, further details of an embodiment for training a neural network utilizing training data will now be described. A neural network 530, such as a convolutional neural network, is trained using a training dataset 532 that includes images as described herein. The training includes with a forward pass through the neural network 530 to produce an image classification. In the illustrated embodiment, a thermal image such as a thermal image of an elephant is fed to the neural network 530 to produce a classification at the output layer. Each image is labeled with the correct classification and the output of the neural network 530 is compared to the correct label. If the neural network 530 mislabels the input image (e.g., determines that the image is a "rhinoceros" instead of an "elephant"), then a backward pass through the neural network 530 may be used to adjust the neural network (e.g., weights) to correct for the misclassification. Referring to FIG. 5C, a trained neural network 540, may then be implemented on a run time environment to classify images 542. The run time environment may include an inference camera and/or a host image classification system.

Figure 6:
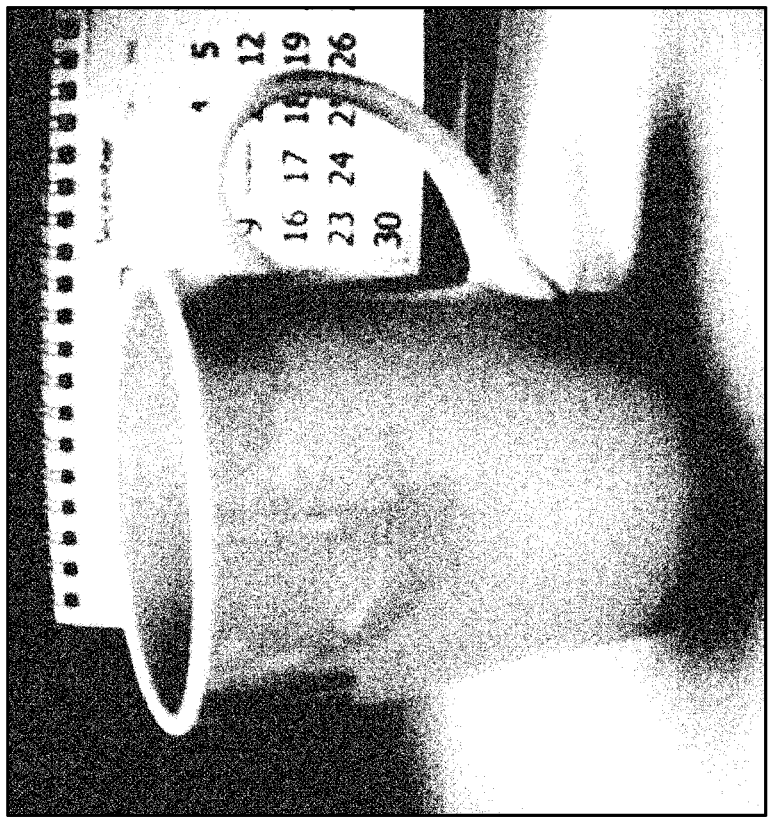
FIG. 6 illustrates an example implementation of an inference imaging system, in accordance with various embodiments of the present disclosure.
Figure 6:
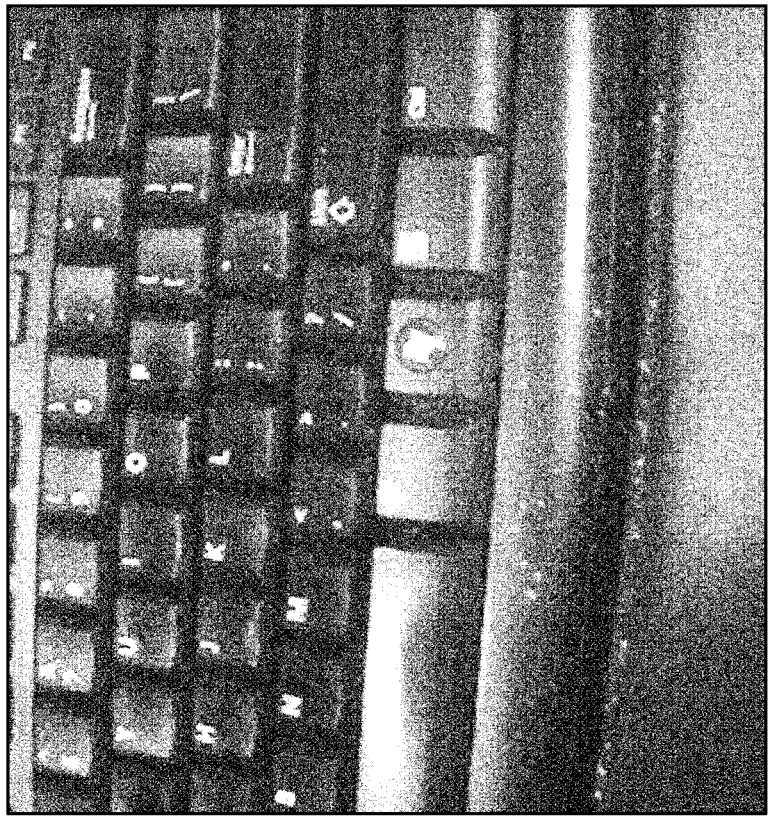

Various implementation embodiments will now be described with reference to FIGS. 6-8. As illustrated in FIG. 6, the inference camera may be configured to analyze an image and produce a classification (e.g., "computer keyboard keypad" in image (a) and "coffee cup" in image (b)), along with a confidence score. The object classification output may be sent from the inference camera to the host system for storage or further processing. The inference result and confidence estimate may be part of the chunk data delivered to the host. The confidence value can be used, for example, to filter out inference results below a certain threshold and only send images to the host that meet or exceed the threshold.

Figure 7:
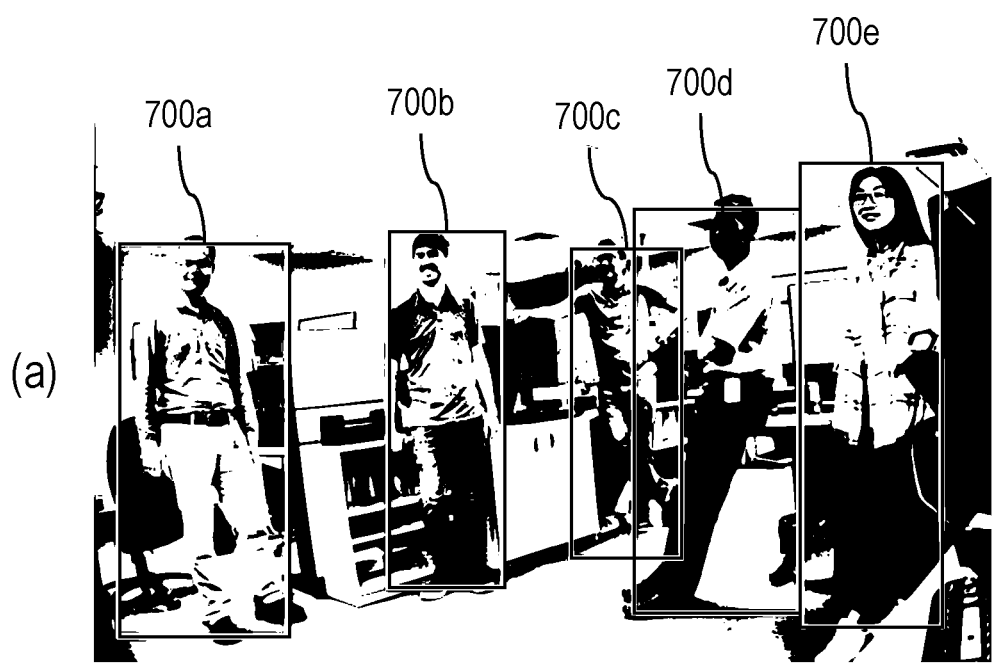
FIG. 7 illustrates an example implementation of an inference imaging system, in accordance with various embodiments of the present disclosure.
Figure 7:
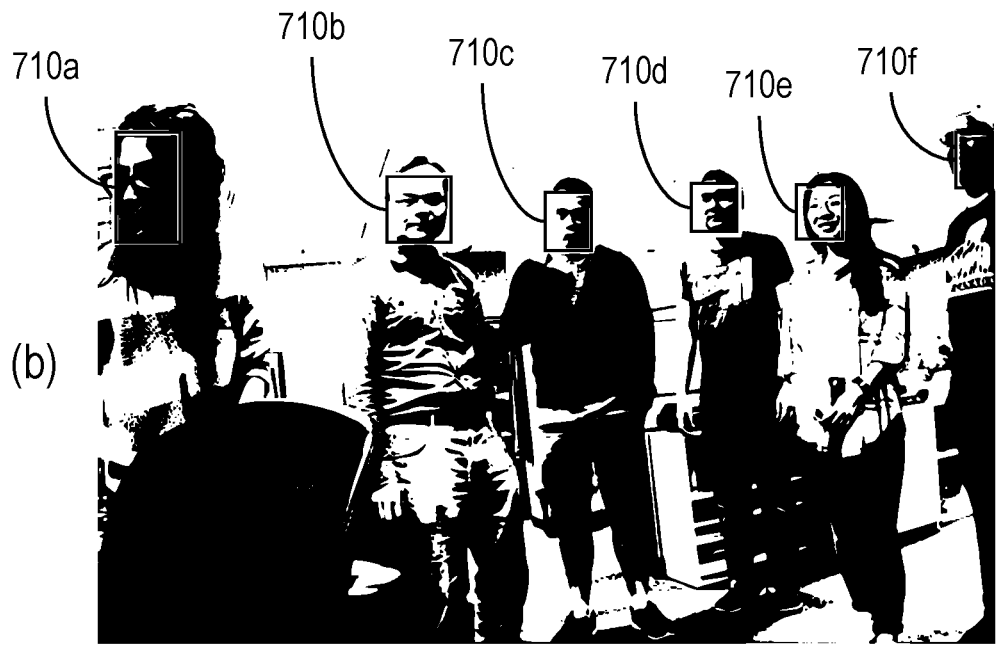

FIG. 7 illustrates another implementation embodiment in which the objects are detected using the inference camera and detected objects are then sent to a host system for further processing. In another embodiment, the inference camera may include other inference networks for further image processing of detected objects. As illustrated the output may include detection of a person (see, e.g., bounding boxes 700a-e in image (a)), detection of a face (see, e.g., bounding boxes 710a-f in image (b)), or other objects useful for a system implementation. Confidence value can be used to filter out detections below a certain threshold.

Figure 8:
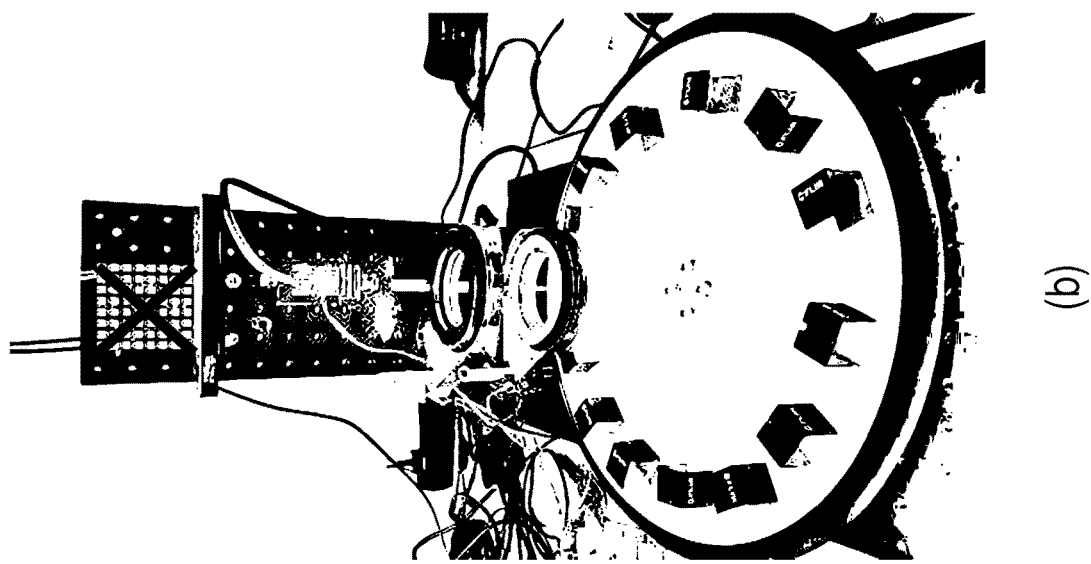
FIG. 8 illustrates an example implementation of an inference imaging system, in accordance with various embodiments of the present disclosure.
Figure 8:
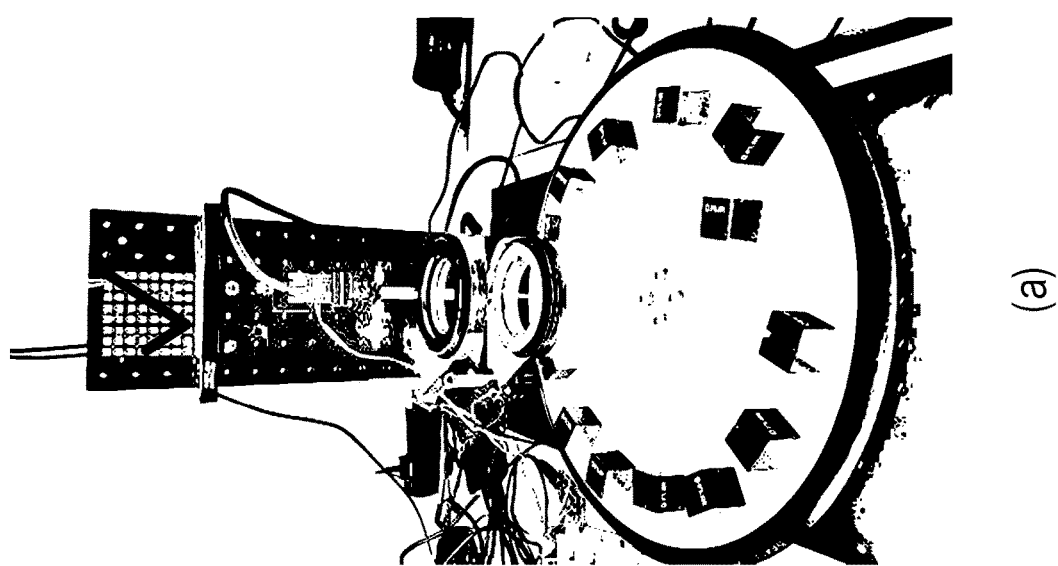

FIG. 8 illustrates an implementation embodiment that operates as a standalone system without an outside host. As illustrated, an inference camera system is used in a machine vision application to inspect parts and outputs a "check mark" (image (a)) or other indicia if the part passes the inspection, and an "X" or other indicia (image (b)) if the part fails inspection. Thresholds may be applied to confidence values output by the inference network to decide inspection result to display. In one embodiment, the inference camera system outputs the inspection results via GPIO pins connected to a controller to convey an associated action to be taken (e.g., activate the display to show the result). The inference camera system may further perform an anomaly detection to identify defects and/or indicate where the defects are in the detected objected. The inspection results may include streaming the image to a host system, storing the image on the imaging device, and communicating information (e.g., the inference result, confidence, location of the results) to a peripheral device via GPIO, and/or executing a second inference network. Communications may be facilitated using binary logic values via GPIO, encoded values with multiple GPIO, pulse width modulation, serial port communication over the GPIO pins and/or other communications protocols. In some embodiments, communications protocols are configured to allow a higher level of automated control for systems like autonomous robots, or cameras on pan/tilt mounts.

The systems and methods disclosed herein may be applied to various computer vision applications, such as object classification and detection using stereo images. Stereo imaging with two or more cameras and/or a single camera with two or more image capture components may be used to obtain three-dimensional information of an object in a scene. For many robotics applications, for example, an analysis of stereo images may provide advantageous information, such as a location of a detected object in three-dimensional (3D) space. In various embodiments, the deep learning inference systems and methods disclosed herein are implemented in a stereo image processing system.

In one embodiment, a deep learning stereo camera system is configured to facilitate user selection and loading of a pre-trained neural network. The stereo camera system may comprise one or more cameras configured to receive stereo images of a scene. The stereo camera system may be equipped with a Vision Processing Unit (VPU) for inference on the edge. The stereo camera captures high quality images and performs deep learning inference onboard the stereo camera. An object detection network analyzes the captured images and produces bounding boxes as regions of interest for stereo processing to determine the 3D location of the objects relative to the stereo camera. The output contains the class labels, 2D bounding boxes as well as 3D world coordinates of the objects of interest.

Many robotics applications require both detection of objects of interest and determination of the objects' locations in 3D, so that the robotic arm can grasp the specific objects, maneuver to and/or around the objects or perform other object-related tasks. While this information can be acquired using two separate vision systems (e.g., one for object detection and the other for generating a 3D point cloud) further advantages can be achieved by combining object detection and 3D location determinations into a single system. Utilizing separate systems also has drawbacks, such as the additional step of registering images/information acquired through the two vision systems.

Stereo cameras may be used with a host computing device to achieve object detection and 3D localization. In various embodiments, a stereo camera includes a vision processing unit with onboard stereo matching and a trained deep learning inference system, which may be deployed in various applications, including industrial applications.

In various embodiments, a stereo deep learning camera system provides both object detection and classification and object localization features in a single system. The stereo camera system may capture stereo images and perform object detection and classification on one of more of the image streams. The bounding boxes from object detection are used to help limit the stereo processing to certain regions of interests. The stereo imaging systems and method described herein will be less processor intensive than conventional system because computation of 3D data may be performed for detected objects, rather than the entire scene. Stereo processing is very computationally intensive for high-resolution imagery. The proposed method allows high-resolution 3D data to be obtained for objects of interests, while avoiding performing stereo matching on the entire high-resolution imagery.

The deep learning stereo camera system may be configured with an interface allowing the user to load a pre-trained deep learning network onto the stereo camera. In some embodiments, the stereo camera includes a Vision Processing Unit (VPU) configure to provide inference on the edge. The stereo camera is configured to capture high quality images and perform deep learning inference onboard the camera. The deep learning network facilitates object detection and produces bounding boxes as regions of interest for input to the stereo processing algorithms. The stereo processing may include using the bounding boxes to identify regions/objects of interest for 3D location processing. The output from the deep learning stereo camera system may include one or more class labels, one or more 2D bounding boxes, and/or 3D world coordinates of the objects of interest.

Embodiments of a deep learning stereo camera system will now be described in greater detail. In one implementation, two separate deep learning enabled cameras (e.g., as described with reference to FIGS. 1-8) are combined in a single stereo system. Object detection is performed onboard one or both cameras using the camera's trained neural network to analyze images captured by the corresponding camera. The two cameras are synchronized and calibrated together to allow for mapping of stereo images and associated data. Stereo matching may be performed on the camera or on a separate device, such as host personal computer.

In another embodiment, a deep learning stereo camera system includes two or image capture components controlled by one or more processing components to capture stereo images and a processing unit, such as a vision processing unit, configured to analyze captured images for object detection and 3D localization information. Suitable vision processing units may include the Intel Movidius Myriad X and/or Ambarella CV2. The stereo camera system is configured to detect and classify objects from one or more image streams and provide 2D and/or 3D locations of the objects of interest detected by the deep learning inference. The stereo camera could include two or more cameras and various arrangements, including a binocular stereo camera system. In one embodiment, the stereo cameras are calibrated and produce rectified images for the deep learning inference.

Figure 9:
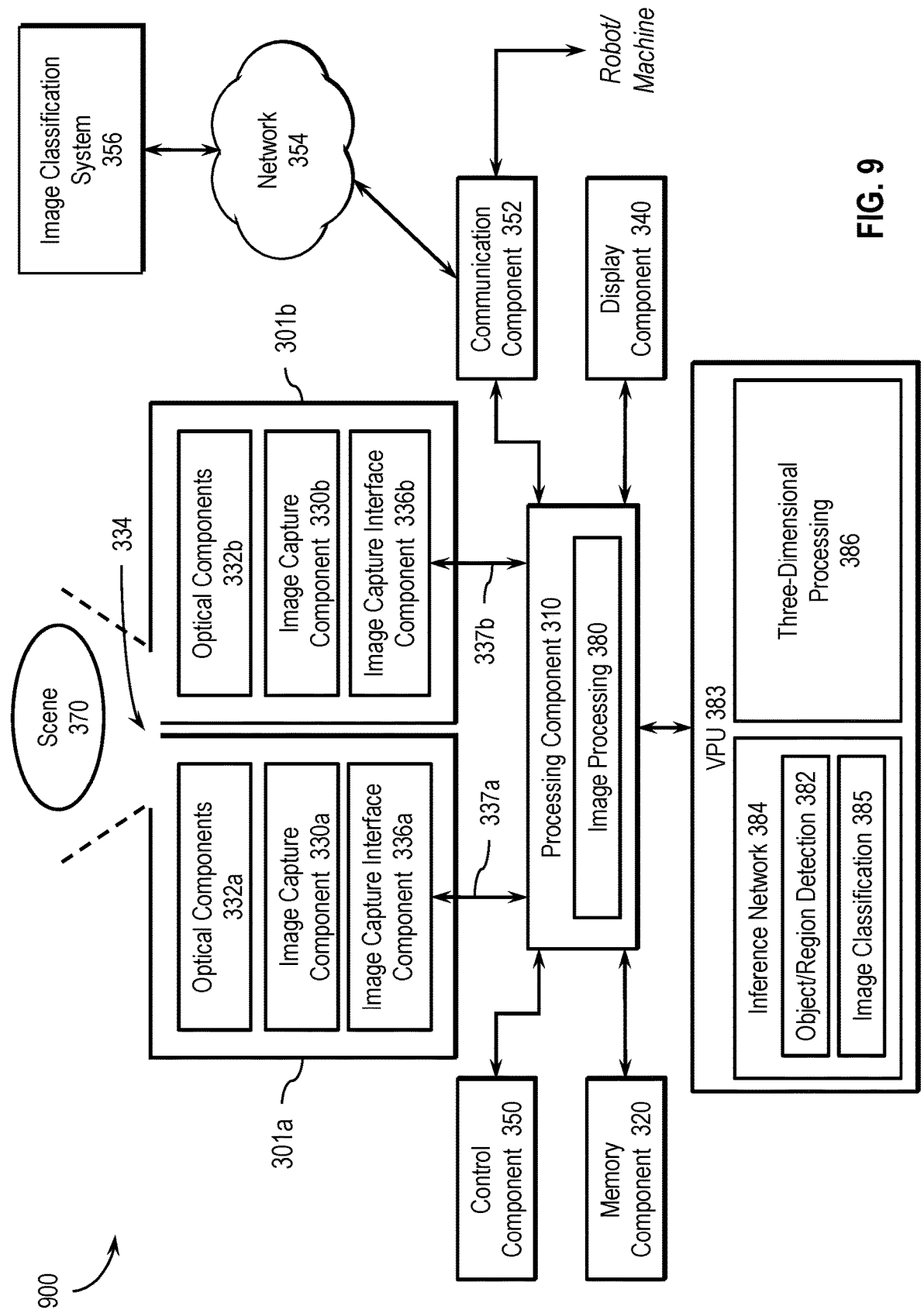
FIG. 9 illustrates an example implementation of a stereo inference camera, in accordance with various embodiments of the present disclosure.

Referring to FIG. 9, various embodiments of a stereo camera system 900 will now be described in further detail. The stereo camera system 900 may include one or more components previously disclosed with reference to the inference camera 300 of FIG. 3. The stereo camera system 900 includes two sets of camera components 301a (including components 332a, 330a, 336a and 337a) and 301b (including components 332b, 330b, 336b and 337b) each configured to capture separate images of the scene 370. The camera components 301a and 301b are configured to capture images simultaneously (or approximately simultaneous) by the processing component 310. The pair of captured images is provided to the process component 310 for further processing and analysis. The VPU 383 includes one or more inference networks 384 configured to perform object and/or region of interest detection 382 and object classification 385 on the images of the image pairs. The inference network 384 may be further configured to detect a two-dimensional location of the detected object in the image, generate feature data and/or object-related information for the three-dimensional processing component 386, and/or perform other tasks. The three-dimensional processing component 386 receives the image pairs and inference data (e.g., extracted features, object location object classification) and determines a spatial location of the detected object. In some embodiments, the data output by the inference network 384 and the three-dimensional processing components 386 are provided to a processing component and/or external system for controlling a robot and/or machine.

Figure 10:
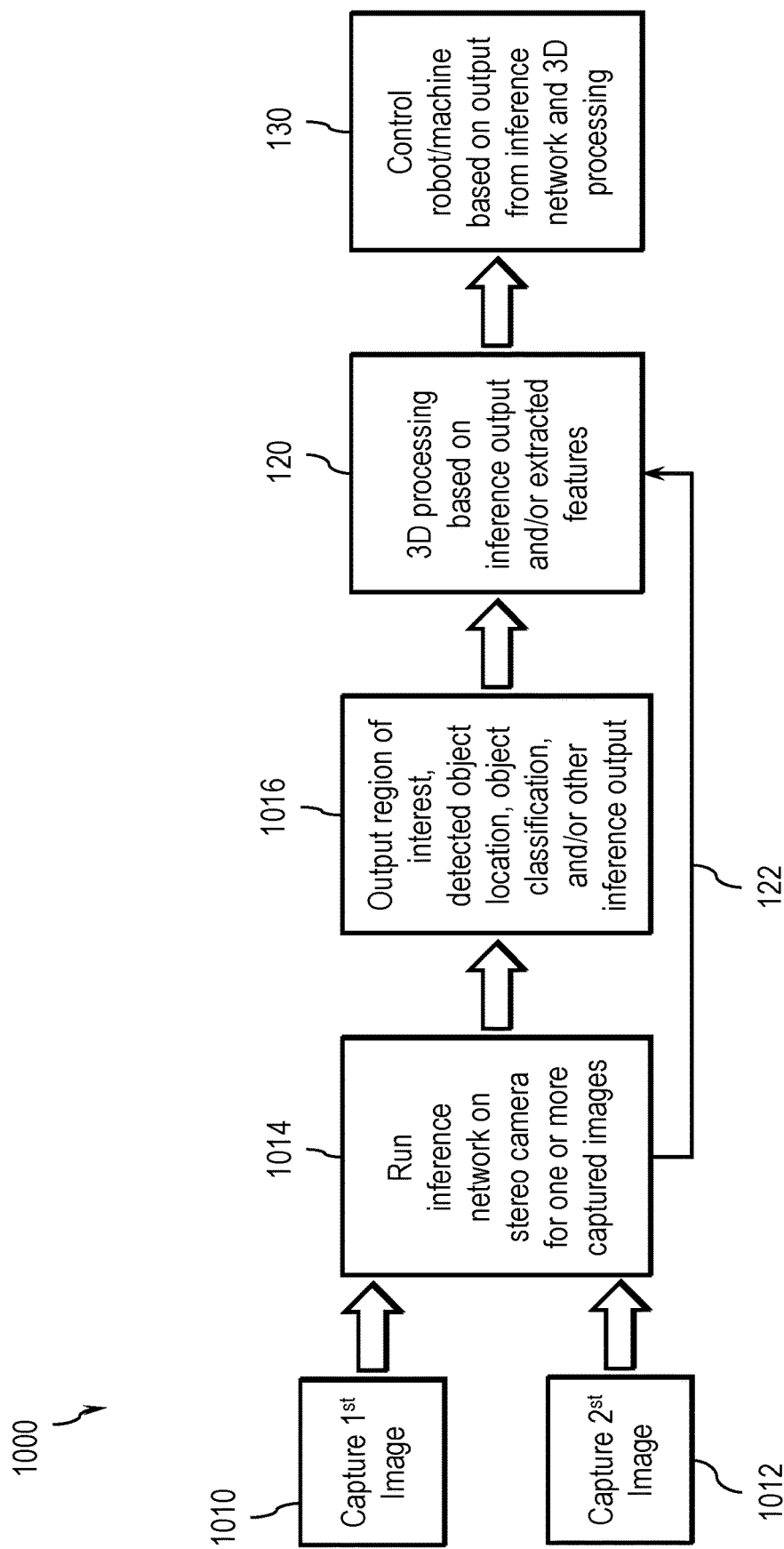
FIG. 10 illustrates an example process for operating the stereo inference camera of FIG. 9, in accordance with various embodiments of the present disclosure.

An example process 1000 for operating the stereo camera system 900 will now be described with reference to FIG. 10. In steps 1010 and 1012, a pair of images is captured by the stereo camera. The image stream is provided to an inference network 1014, which processes one or more images from the image pair to detect, classify and locate one or more objects. The inference network outputs a region of interest, detected object, object classification and/or other inference output in step 1016. In one embodiment, if an object or region is detected, then 3D processing is performed in step 120 on the captured image pair to determine a real-world location of the detected object relative to the position of the stereo camera. To facilitate efficient, real-time processing, the 3D processing (e.g., image registration, 3D location determination, etc.) is performed on selected regions of interest as detected by the inference network. The 3D processing may further receive one or more image features 122 extracted from a feature extraction layer of the inference network. The results of the 3D processing may then be used in step 130 to control a robot, machine or other process.

The deep learning inference detects objects of interest and provides bounding boxes of their 2D locations in the captured image from one or more of the stereo images capture components. The deep learning stereo camera performs stereo matching on the entire rectified images, or in regions of interest based on the bounding boxes to produce 3D data for the objects of interest. The deep learning inference and stereo matching are done onboard the stereo camera. If stereo matching is performed on a host computer, it can be omitted when no objects of interest are detected to reduce computational load. The stereo matching can be either a correlation-based method to generate a dense 3D point cloud, or feature-based method to generate a sparse 3D point cloud. Image features computed during the deep learning inference can be used as features for stereo matching. The 3D data would be used to control a robotic arm to grasp the object, 3D reconstruction of the object, etc.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   two or more image capture components configured to capture a corresponding pair of two-dimensional images of a scene;
   a vision processing unit configured to process the pair of two-dimensional images through a first trained inference network to detect an object of interest and determine a first inference result comprising a bounding box corresponding to a location of the detected object in at least one of the images, a classification of the detected object, and a confidence score associated with the classification, wherein at least one image feature computed during operation of the first trained inference network is used as a feature for stereo matching;
   a processing component configured to process the first inference result and determine real-world coordinates of the detected object based on the location of the bounding box in the pair of two-dimensional images; and
   a second trained inference network, wherein:
      if the confidence score exceeds the threshold, the second trained inference network is configured to receive the first inference result as an input and output a second inference result;
      wherein three-dimensional data is used to control a robotic system to interact with the detected object;
      wherein the vision processing unit is further configured to perform stereo matching on regions of interest in the two-dimensional images based on the bounding box to produce spatial location information for the object of interest;
      wherein the stereo matching is performed when the object of interest is detected; and
      wherein the stereo matching includes a correlation-based method and/or a feature-based method to generate a three-dimensional point cloud.

2. The system of claim 1, wherein the bounding box comprises a two-dimensional and/or three-dimensional location.

3. The system of claim 1, wherein the two or more image capture components comprise a binocular stereo camera system; and
   wherein the two or more image capture components are calibrated and produce rectified image pairs for input to the first trained inference network.

4. A method comprising:
   loading onto a vision processing unit of an imaging device a first trained inference network;
   capturing an image pair of a scene using two or more imaging components of the imaging device;
   processing the image pair through the first trained inference network to detect an object of interest and determine a first inference result comprising bounding boxes corresponding to two-dimensional locations in at least one of the images in the image pair of the detected object in at least one of the images, wherein at least one image feature computed during operation of the first trained inference network are used as features for stereo matching when objects of interest are detected; and
   determining, based on the first inference result, an action for the image pair; and
   controlling a robotic system to interact with at least one of the detected objects based on three dimensional data;
   performing stereo matching on regions of interest in the image pair based on the bounding boxes to produce spatial location information for the objects of interest, wherein the stereo matching is performed when objects of interest are detected; and
   wherein the stereo matching includes a correlation-based method and/or a feature-based method to generate a three-dimensional point cloud.

5. The method of claim 4, further comprising:
   training, by a host system, a neural network for image classification to produce the first trained inference network;
   optimizing the first trained inference network for an image classification application;
   converting the optimized first trained inference network for operation on the vision processing unit of the imaging device; and
   uploading the converted optimized first trained inference network from the host system to the vision processing unit of the imaging device.

6. The method of claim 4, wherein the first inference result further includes an anomaly detection.

7. The method of claim 4, further comprising transmitting the first inference result to a host system.

8. The method of claim 4, wherein the action includes streaming the image pair to a host system, storing the image pair on the imaging device, and/or communicating the inference result to a peripheral device via GPIO.

9. The method of claim 4, wherein loading onto the vision processing unit further comprises encrypting and storing the first trained inference network in a first memory; and wherein the method further comprises decrypting and loading the first trained inference network into a random-access memory for inference; and wherein the image pair comprises a visible spectrum image, infrared image, color image, hyperspectral image, grayscale image, monochrome image and/or a time-of-flight image.

10. A system comprising:
    two or more image capture components configured to capture a pair of images of a scene;
    a vision processing unit configured to process the image pair through a first trained inference network to determine a first inference result, wherein the first trained inference network detects objects of interest in the image pair and generates bounding boxes of corresponding two-dimensional locations in at least one of the images in the image pair, wherein at least one image feature computed during operation of the first trained inference network are used as features for stereo matching when objects of interest are detected; and
    a processing component configured to process the first inference result and determine, based on the first inference result, an action for the image pair;
    wherein three-dimensional data is used to control a robotic system to interact with at least one of the detected objects;
    wherein the vision processing unit is further configured to perform stereo matching on regions of interest in the image pair based on the bounding boxes to produce spatial location information for the objects of interest;
    wherein the stereo matching is performed when objects of interest are detected; and
    wherein the stereo matching includes a correlation-based method and/or a feature-based method to generate a three-dimensional point cloud.

11. The system of claim 10, further comprising:
a host system configured to train a neural network for image classification and produce the first trained inference network and transmit the first trained inference network to the vision processing unit; and
wherein the host system is further configured to optimize the first trained inference network for an image classification application, convert the optimized first trained inference network for operation on the vision processing unit, and upload the converted first trained inference network from the host system to the vision processing unit.

12. The system of claim 10, wherein the first inference result further includes an anomaly detection, wherein the anomaly detection comprises identifying defects and indicating where the defects are in the detected object.

13. The system of claim 10, further comprises an image processing component configured to receive the image pair captured by the two or more image capture components and modify the image pair for input to the first trained inference network.

14. The system of claim 10, wherein the processing component is further configured to stream the image pair to a host system, store the image pair on the two or more image capture components, and/or communicate the inference result to a peripheral device via GPIO.

15. The system of claim 10, wherein the two or more image capture components are configured to capture visible spectrum images, infrared images, color images, hyperspectral images, grayscale images, monochrome images and/or time-of-flight images.

16. The system of claim 10, wherein the first trained inference network is encrypted and stored in a first memory, and wherein the first trained inference network is decrypted and loaded into a random-access memory for inference.

17. The system of claim 10, wherein the processing component is further configured to determine real-world coordinates of the detected objects based on the locations of the bounding boxes in the image pair.

* * * * *